United States Patent [19]

Williams

[11] 4,273,350

[45] Jun. 16, 1981

[54] FOLDING WHEELCHAIR

[76] Inventor: Patrick Y. Williams, Golden Eagles Flats, 6 Fawcett St., Ballina, New South Wales, Australia, 2478

[21] Appl. No.: 17,704

[22] Filed: Mar. 5, 1979

[30] Foreign Application Priority Data

Mar. 15, 1978 [AU] Australia ............................ PD3730

[51] Int. Cl.[3] ............................................ B62M 1/14

[52] U.S. Cl. ............................ 280/242 WC; 280/647; 297/44; 297/45; 297/DIG. 4

[58] Field of Search ............ 280/242 R, 242 WC, 42, 280/647, 650; 297/42, 44, 45, DIG. 4

[56] References Cited

U.S. PATENT DOCUMENTS

| | | | |
|---|---|---|---|
| 2,782,870 | 2/1957 | Sill | 297/44 X |
| 3,142,351 | 7/1964 | Green | 280/42 X |
| 3,228,724 | 1/1966 | Resar | 297/45 |
| 3,758,150 | 9/1973 | Williams | 297/45 |

*Primary Examiner*—Randolph A. Reese

*Assistant Examiner*—Michael Mar

*Attorney, Agent, or Firm*—Laubscher & Laubscher

[57] ABSTRACT

A folding wheelchair has side frames connected by front, rear and bottom toggle braces which in the folded position permit the side frames to come together. Each toggle brace is preferably formed from a pair of U-shaped elements hingeably connected at the base of the U, the toggle braces co-operating with the framework such that folding is initiated by lifting upwardly of the bottom toggle brace. This is best achieved by a rigid rod linking the front and rear toggle braces and carrying abutment element for engaging with the bottom toggle brace so that folding of the front and rear toggle braces cannot occur until the bottom toggle brace is lifted. The wheelchair may have at least one toggle brace of U-shaped members with the base of each U divided transversely to provide for relative rotational motion between the portions of each U-shaped member. The wheelchair may also have a novel folding footrest.

14 Claims, 6 Drawing Figures

FOLDING WHEELCHAIR

FIELD OF THE INVENTION

The present invention relates to folding wheelchairs and may be applied to wheelchairs suitable for even heavy adults.

BACKGROUND TO THE INVENTION

In the past folding wheelchairs have commonly been constructed with a seat supported on a framework which has scissor-like bracing permitting the chair to be collapsed so that the vertical sides come towards one another. However, generally such wheelchairs have been heavy and relatively bulky thus presenting problems in loading the wheelchair into a vehicle.

Desirably, a folding wheelchair should be folded readily into a very compact space so that it can be loaded into a small car and furthermore it should be relatively lightweight to permit easy handling of the chair. However, the wheelchair must be strong and durable since wheelchairs are subjected to considerable stresses particularly when the user jumps over gutters or plays sports such as wheelchair basketball. It is also important that a wheelchair can be quickly and easily be folded, for example by a handicapped person after he has transferred himself to the seat of a vehicle.

In this specification the expression "wheelchair" is used not only to cover wheelchairs for invalids but also to cover other forms of wheeled carriages including various forms of baby carriage. Although a major and important application of the present invention is to wheelchairs for invalids and handicapped persons, the invention may also find other applications.

One of the most important design factors for a folding wheelchair is the thickness of the unit when folded. Indeed even a small decrease in the thickness of a folded chair can be extremely valuable in permitting the chair to be loaded into and stored in cars, particularly small cars. Much of the thickness is taken up by main rear wheels which when each rear wheel has a rigid hand rim results in each wheel requiring several inches of thickness. Wheelchairs hitherto available have had, at best, an overall thickness of about 10" when folded and furthermore have had the severe disadvantage of being relatively heavy, for example of the order of 50 lbs. or more.

The present inventor has proposed a useful alternative to wheelchairs hitherto on the market in his U.S. Pat. No. 3,758,150 but it is considered that still further improvements and modifications would be desirable.

SUMMARY OF THE INVENTION

The present invention is concerned with providing an improved foldable framework for a wheelchair, the framework being capable of being folded so as to be relatively thin and the design of the framework being such that it may be constructed so as to be relatively light in weight yet still durable.

More specifically the invention is directed to a folding framework in a wheelchair in which side frames carrying a folding seat and mounted on wheels are interconnected by toggle brace assemblies which are pivotally connected to and extend between front, rear and bottom portions of the side frames and are foldable between a bracing position in which the side frames are held apart and a folded position in which the side frames can be adjacent to one another. One inventive aspect in such a wheelchair is further characterised by the provision of holding means mounted in co-operating relationship with the bottom toggle brace assembly for urging the front and rear toggle brace assemblies into their bracing positions until the bottom toggle brace assembly is lifted towards its folded position.

According to a further inventive feature, at least the front toggle brace assembly can be in the form of a pair of U-shaped elements pivotally interconnected by a hinge at the base of the U and a folding footrest assembly pivotally mounted on each U-shaped element and foldable within the U-shaped element prior to folding of the wheelchair.

According to yet another inventive feature at least one of the toggle brace assemblies is formed from a pair of U-shaped elements pivotally interconnected through a hinge at the base of the U with the free end portions of the legs of each U-shaped element connected pivotally over a rail of the side frame of the wheelchair and the base of each U-shaped element being tranversely divided to form two base portions which are mounted within a sleeve of the hinge so as to be rotatable relative to one another so as to permit flexing of the wheelchair when in use.

In a preferred and important embodiment of the invention, the holding means is in the form of a rigid pivotal link pivotally connected to the front and rear toggle brace assemblies which fold rearwardly.

Furthermore, the best manner of ensuring that the front and rear toggle brace assemblies do not commence to fold until the bottom toggle brace assembly has been lifted is to provide an abutment element projecting upwardly from the rigid link for engagement with a front portion of the bottom toggle grace assembly.

The best manner of ensuring easy and reliable folding of the front and rear toggle brace assemblies is to provide a cam-like striker element projecting upwardly and forwardly from a rear portion of the rigid link so as to be engaged and displaced by the bottom toggle brace assembly as it is lifted.

A convenient remote lifting device for the bottom toggle brace assembly can be provided and indeed this feature can also ensure positive locking of the bottom toggle brace assembly even though positive locking is not essential providing the framework is manufactured in a sound manner. Most preferably the remote lifting device is provided by an operating rod pivotally linked to a central region of the bottom toggle brace assembly and extending upwardly to a suitable connection point. The top of the operating rod can be attached to a folding seat of the wheelchair so that the folding seat is simply pulled upwards towards the folded position thereby pulling upwardly the operating rod. When is use, however, the weight of the user of the seat urges downwardly the operating rod thereby positively locking the framework in the erected position.

In this specification the term "toggle brace" is used to refer to any form of brace having two pivotally connected arms which tend to remain in a braced condition when extended. Frameworks embodying the present invention preferably have toggle brace assemblies comprising a pair of U-shaped bracing arms but this is not essential; furthermore it is not essential for the bracing arms to go "over centre" to the bracing position.

Advantageously a further brace, preferably a toggle brace, is mounted at a position spaced behind the position for the backrest of the framework thereby provided extra strengthening of the framework.

BRIEF DESCRIPTION OF THE DRAWINGS

For the purposes of illustration only, an embodiment of the invention will now be described with reference to the accompanying drawings of which.

DETAILED DESCRIPTION OF THE DRAWINGS

Figure 1:
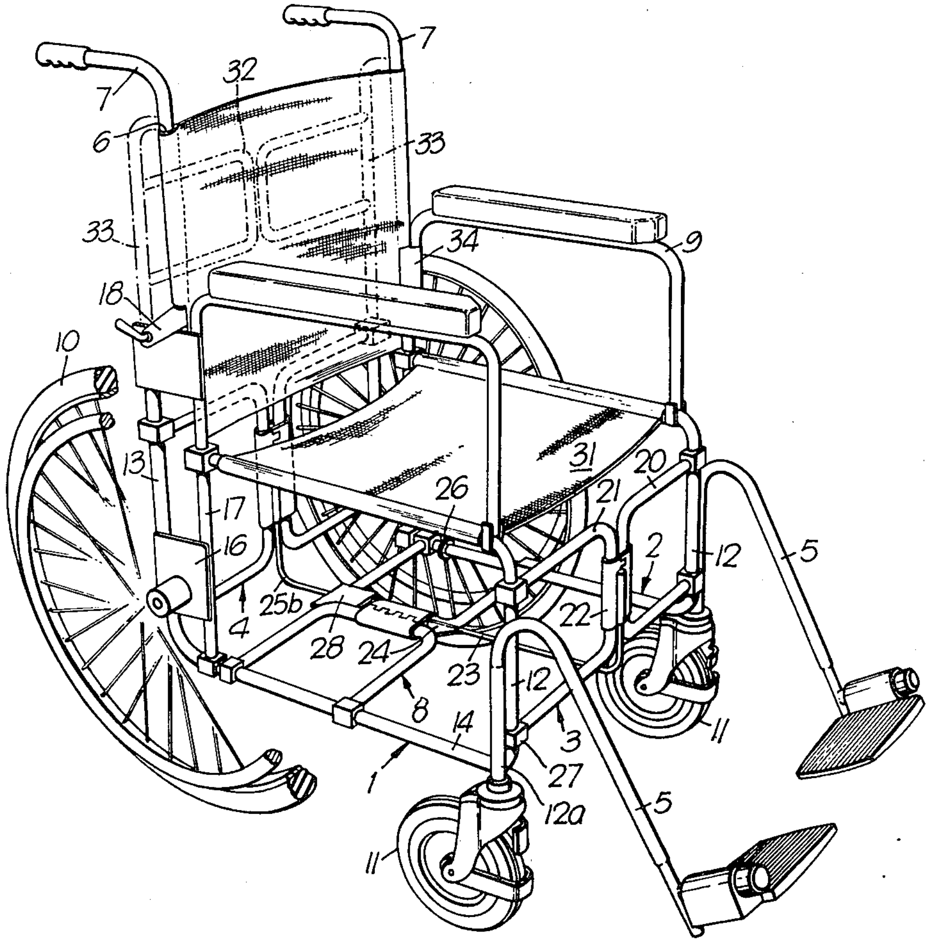
FIG. 1 is a perspective view of an embodiment of the invention.

Referring first to FIG. 1, the collapsible folding wheelchair is formed from side frames 1 and 2, front and rear toggle braces 3 and 4, removable footrest units 5, foldable side frame extensions 6 each having a handle 7, a bottom toggle brace 8, detachable arm rests 9, two large rear wheels 10, and small front castor wheels 11.

Each side frame 1 and 2 consists of a generally rectangular tubular metal frame work formed from front and rear vertical tubes 12 and 13 and upper and lower horizontal tubes 15 and 14. Each castor wheel 11 is mounted in a small tube **12*a* attached to the vertical tube 12, the footrest telescopically engaging in the top of the tube 12*a*. Each rear wheel 10 is mounted on an axle attached to a bracket 16 which spans between the vertical tube 13 and an auxiliary back tube 17**, this providing a lightweight but strong and durable structure.

At a position above the seat height, each of the upstanding side extensions 6 is articulated and secured in position by a clamp 18.

Each of the toggle braces 3, 4 and 8 are similar and only the front toggle brace will be described in detail. The front toggle brace 3 comprises a pair of U-shaped members 20, 21 with the legs of each U extending horizontally and the free ends pivotally connected to the associated vertical tube 12 by a pivotal mounting block 27, a preferred form of which is described below with reference to FIG. 5. Collar-like stops such as stop 26 shown in the lower rail 14 can limit movement of the toggle brace along the axis of the rail to which it is attached. A sleeve-like hinge 22 connects the U-shaped members at the base of the U, further details being described below with reference to FIGS. 5 and 6.

For the purpose of (a) providing rigidity in the wheelchair when erected, and (b) facilitating erection and collapsing in a reliable manner and (c) ensuring that no folding of the wheelchair occurs in the event that the front toggle brace 3 receives a kick, a rigid link 23 extends below the bottom toggle brace 8, the rigid link being pivotally connected to the front and rear toggle braces by the upturned ends **25*a* and 25*b* of the rigid link being pivotally engaged in respective mounting tubes 22*a* fixed to the associated hinges of the toggle braces. The rigid link 23 in its central portion has an upwardly projecting abutment stop 24 and a striker element 28. In the erected condition shown in FIG. 1, the rear edge of the abutment element 24 is adjacent the front end of the hinge at the bottom toggle brace 8 thereby preventing either of the rear or front toggle braces being folded until the bottom toggle brace 8 is first lifted. The striker plate 28 has a cam-like nose disposed so that when the bottom toggle brace 8 is lifted, after a small amount of motion sufficient for the hinge to clear the abutment stop 24, the rear of the hinge of the bottom toggle brace displaces the striker plate 28** rearwardly thereby initiating closure of the front and rear toggle braces.

Figure 2:
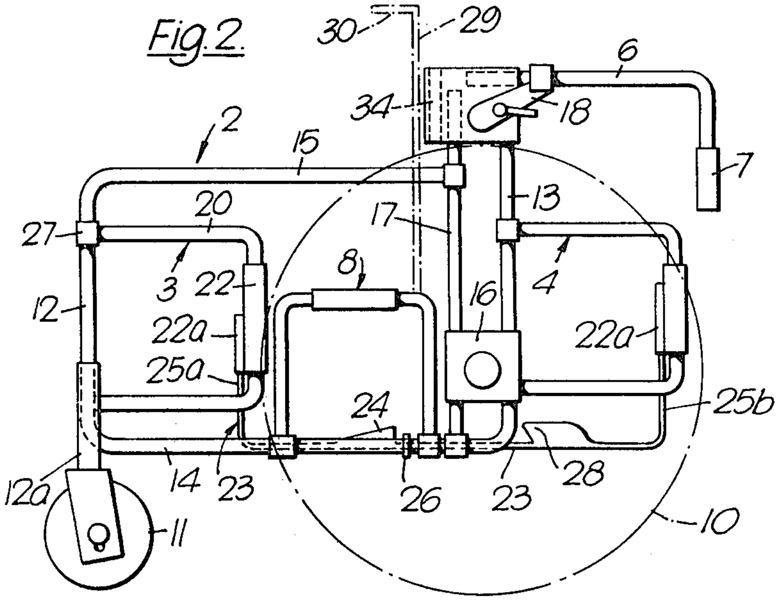
FIG. 2 is a schematic side elevation showing the wheelchair of FIG. 1 in a folded condition.

Folding of the wheelchair and also reliable retention of the framework in an erect condition is facilitated by an operating rod 29 for convenience shown only in FIG. 2 in dotted lines. The bottom end of the operating rod is pivotally connected to the rear central region of the bottom toggle brace 8, the operating rod 29 extending upwardly to a connection portion 30 which in one embodiment is simply attached to the foldable fabric seat 31.

To collapse the wheelchair, the fabric seat is simply gripped and pulled upwardly thereby pulling the operating rod 30 which lifts the real toggle brace and by virtue of engagement with the striker plate 28 all the toggle braces collapse simultaneously. When the chair is in use, the weight of the user urges the operating rod 29 downwardly thereby holding down the bottom toggle brace 8.

FIG. 1 shows a further optional feature, namely a fourth toggle brace 32 of similar form attached to auxiliary side tubes 33. This toggle brace folds rearwardly and in the erected condition moves "over centre" to brace the back of the wheelchair. This toggle brace must be released first before the chair can be folded.

The armrests 9 are readily removable with a rear tube of the armrest telescopically engaging in an tube 34 and the front tube of the armrest engaging over the front of the side rail 15.

Figure 3:
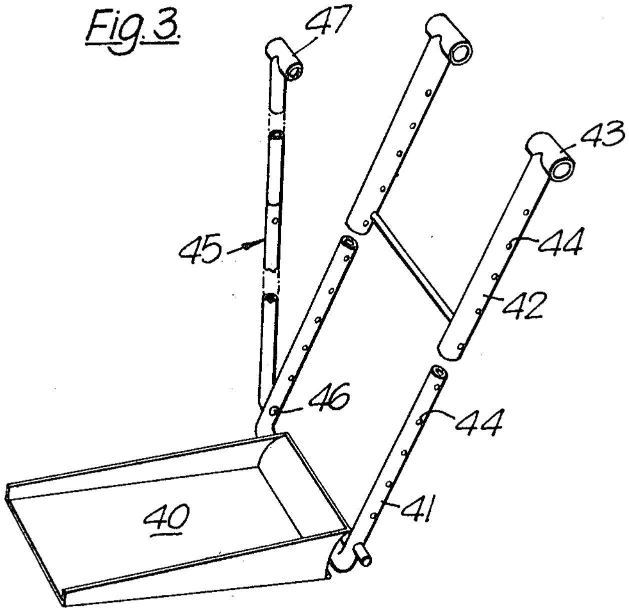
FIG. 3 is a view on a enlarged scale illustrating an optional alternative footrest arrangement.
Figure 4:
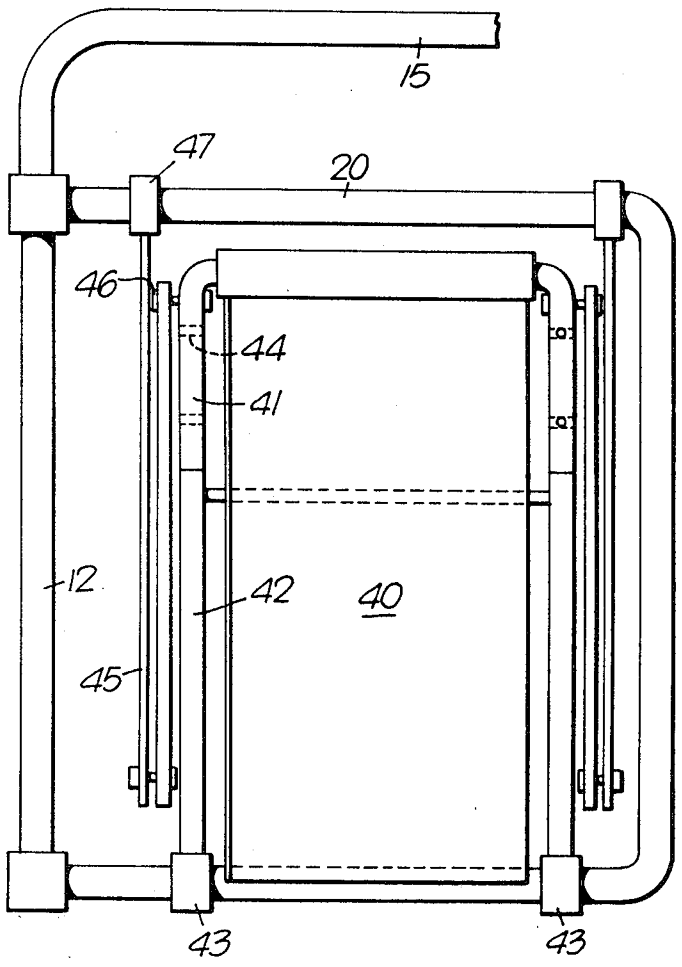
FIG. 4 is a view on an enlarged scale showing the footrest of FIG. 2 when in the folded condition.

Referring now to FIGS. 3 and 4, an alternative footrest is illustrated. This type of footrest can fold entirely within the U-shaped element 20 or 21 of the front toggle brace 3 and is pivotally connected thereto. Furthermore this style of footrest can positively locate the foot of a handicapped person.

The footrest of FIGS. 3 and 4 comprises a foot plate 40 having side flanges which is pivotally mounted on a bottom bracket 41 with limited rotational movement, the bottom bracket 41 being telescopically engageable within the tubes of an upper bracket 42 having top cross tubes 43 pivotally engaged on the lower horizontal leg of the toggle brace 3. Apertures 44 are provided so as to permit adjustment of the footrest, a fixing pin being inserted through a pair of aligned apertures at a selected position.

A pair of side stays 45 are provided but only one of these stays is shown in FIG. 3. Each stay has upper and lower arms pivotally joined, the lower arm being pivotally connected by a pivot pin 46 to the arm 41 and the upper arm being pivotally mounted by a mounting block 47 to the upper horizontal leg of the U-shaped toggle brace.

Figure 5:
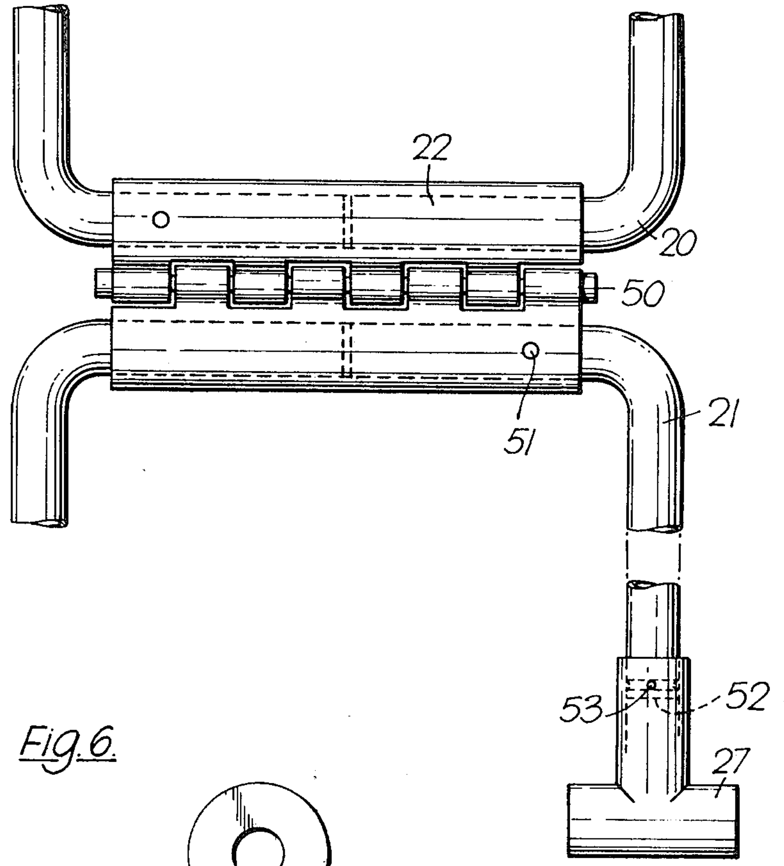
FIG. 5 is a view on an enlarged scale showing the a preferred form of hinge for each toggle brace.
Figure 6:
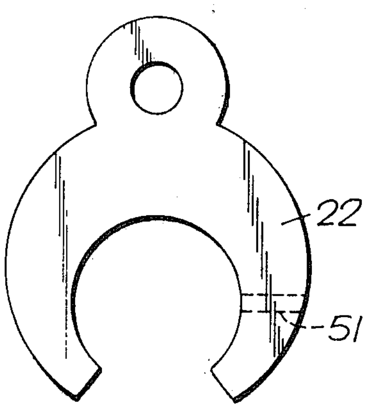
FIG. 6 is an end view of one of the sleeve-like hinge elements for the hinge of FIG. 5.

Referring now to FIGS. 5 and 6, details of a preferred embodiment of hinge connection 22 are shown. In this case the hinge 22 is fabricated from a pair of corresponding mouldings shown in end view in FIG. 6 and adapted to be snap fitted over the base portion of the associated U-shaped element 20 or 21. A hinge pin 50 is securely positioned to complete the hinge.

In order to absorb stresses resulting from the wheelchair passing over rough ground, limited articulation between the respective arms of each U-shaped element is possible since the base of each U is divided as shown in FIG. 5. One of the base portions only may be attached positively to the hinge by a rivet 51.

Furthermore there is preferably provision for rotation between each leg of a U-shaped element and its associated mounted block 27. This can be conveniently achieved as shown in FIG. 5 by providing an annular groove 52 near the end of the leg of the U-shaped element and centre punching at 53 the exterior of the mounting block 27.

I claim:

1. In a folding wheelchair comprising first and second side frames mounted on wheels, a folding seat extending between the side frames, and toggle brace assemblies pivotally connected to and extending between the side frames, the improvement comprising providing said toggle brace assemblies as front, rear and bottom toggle brace assemblies respectively pivotally connected to and extending between front, rear and bottom portions of the side frames, each toggle brace assembly being foldably displaceable between a bracing position in which the side frames are held apart and a folded position in which the side frames move adjacent to one another, and holding means for the front and rear toggle brace assemblies, the holding means being engageable with the bottom toggle brace assembly when in the bracing position to hold the front and rear toggle brace assemblies against folding displacement until commencement of folding of the bottom toggle brace assembly.

2. A wheelchair according to claim 1, wherein in the folded position the front and bottom toggle brace assemblies lie within the side frames and the rear toggle brace assembly extends rearwardly of the side frames.

3. In a folding wheelchair comprising first and second side frames mounted on wheels, a folding seat extending between the side frames, and toggle brace assemblies pivotally connected to and extending between the side frames, the improvement comprising providing said toggle brace assemblies as front, rear and bottom toggle brace assemblies respectively pivotally connected to and extending between front, rear and bottom portions of the side frames, each toggle brace assembly being foldably displaceable between a bracing position in which the side frames are held apart and a folded position in which the side frames move adjacent to one another, and holding means comprising a rigid link pivotally connected about vertical axes to central portions of the front and rear toggle brace assemblies, the rigid link extending below the bottom toggle brace assembly for being held by the bottom toggle brace assembly when in the bracing position to prevent folding displacement of the front and rear toggle brace assemblies.

4. A wheelchair according to claim 3, wherein the rigid link has an upward projection providing an abutment surface for engaging a front portion of the bottom toggle brace assembly for preventing the front and rear toggle braces being folded prior to commencement of folding of the bottom toggle brace.

5. A wheelchair according to claim 4, wherein the rigid link includes a striker element extending upwardly at a location adjacent to the rear of the bottom toggle brace when the framework is in the bracing position, the striker element projecting forwardly to provide a cam surface cooperating with the bottom toggle brace which strikes the cam surface when folding commences thereby urging rearwardly the rigid link.

6. A wheelchair according to claim 5 and further comprising an operating rod pivotally connected to a central region of of the bottom toggle brace assembly and extending upwardly to be connected to a rear portion of the folding seat.

7. A wheelchair according to claim 5 wherein the toggle brace assemblies are each formed from a pair of U-shaped tubular elements hinged together at the base of the U and end portions of the legs of each U being pivotally connected to a rail of the side frame, and a foldable footrest being pivotally mounted on each U-shaped element of the front toggle brace assembly, the footrest being foldable within the U-shaped element.

8. A wheelchair according to claim 3 and further comprising an operating rod pivotally connected to and extending upwardly from a central region of the bottom toggle brace assembly, means for urging downwardly the operating rod when the wheelchair is in use, the operating rod being manually upwardly retractable to initiate folding of the wheelchair.

9. A wheelchair according to claim 3 wherein at least one of said toggle brace assemblies substantially is in a dead centre position when in the bracing position.

10. A wheelchair according to claim 3 wherein each of said side frames is generally rectangular and has a rear upstanding leg formed from a pair of substantially parallel spaced tubes at the upper end of which a handle is mounted, the handle being pivotally foldable rearwardly and downwardly to a folded position, the forward one of said spaced tubes mounting a fabric backrest and the rearward one of said spaced tubes mounting a toggle brace assembly adapted to fold rearwardly.

11. A wheelchair according to claim 3 wherein each toggle brace assembly is formed from a pair of U-shaped elements interconnected by a hinge at the base of the U, the hinge having a sleeve-like portion for engaging over the base of each U-shaped element and the base of each U-shaped element being divided transversely in a central region whereby the separate portions may have relative rotational movement about the axis of the base portion.

12. A wheelchair according to claim 11 wherein each leg of each U-shaped element has a T-shaped end piece through which a rail of the side frame passes so that the end piece is pivotally mounted thereon, the end piece being pivotally interconnected with the corresponding leg of the U-shape for motion about the axis of the leg, and stop means being provided on each rail for limiting motion of the associated U-shaped element in a direction along the axis of the rail.

13. A wheelchair according to claim 3 and wherein at least the front of said toggle brace assemblies is formed from a pair of U-shaped elements pivotally interconnected at the base of the U to one another, a foldable footrest assembly being pivotally mounted on each of the U-shaped elements of the front toggle brace assembly and being foldable within the U-shaped element prior to folding of the wheelchair.

14. A wheelchair according to claim 3 and wherein at least one of said toggle brace assemblies is formed from a pair of U-shaped elements interconnected hingeably at the base of the U, the free end portions of the legs of each U-shaped element being pivotally mounted over a rail of the side frame and each U-shaped element being divided transversely at a central region of the base of the U so as to provide two base portions, the base portions being engaged in a retaining sleeve of the hinge and being relatively rotational displaceable about the axis of the sleeve.

* * * * *